United States Patent
Kawarabayashi

(10) Patent No.: US 10,370,513 B2
(45) Date of Patent: Aug. 6, 2019

(54) FLAME-RETARDANT SEALING MATERIAL

(71) Applicant: INOAC CORPORATION, Nagoya-shi, Aichi (JP)

(72) Inventor: Minoru Kawarabayashi, Anjo (JP)

(73) Assignee: INOAC CORPORATION, Nagoya-shi, Aichi (JP)

(*) Notice: Subject to any disclaimer, the term of this patent is extended or adjusted under 35 U.S.C. 154(b) by 0 days.

(21) Appl. No.: 15/100,044

(22) PCT Filed: Nov. 29, 2013

(86) PCT No.: PCT/JP2013/082265
§ 371 (c)(1),
(2) Date: May 27, 2016

(87) PCT Pub. No.: WO2015/079581
PCT Pub. Date: Jun. 4, 2015

(65) Prior Publication Data
US 2017/0002161 A1    Jan. 5, 2017

(51) Int. Cl.
| | |
|---|---|
| *C08G 18/08* | (2006.01) |
| *C08G 18/10* | (2006.01) |
| *C08G 18/40* | (2006.01) |
| *C08G 18/48* | (2006.01) |
| *C08G 18/62* | (2006.01) |
| *C08G 18/69* | (2006.01) |
| *C08G 18/75* | (2006.01) |
| *C08G 18/76* | (2006.01) |
| *C08J 9/00* | (2006.01) |
| *C08K 5/00* | (2006.01) |
| *C08K 5/521* | (2006.01) |
| *C08L 75/04* | (2006.01) |
| *C09K 21/12* | (2006.01) |
| *C09K 3/10* | (2006.01) |
| *C08G 101/00* | (2006.01) |

(52) U.S. Cl.
CPC ............ *C08J 9/0038* (2013.01); *C08G 18/10* (2013.01); *C08G 18/14* (2013.01); *C08G 18/4063* (2013.01); *C08G 18/4829* (2013.01); *C08G 18/62* (2013.01); *C08G 18/6208* (2013.01); *C08G 18/69* (2013.01); *C08G 18/698* (2013.01); *C08G 18/751* (2013.01); *C08G 18/7621* (2013.01); *C08J 9/0061* (2013.01); *C08K 5/0066* (2013.01); *C08K 5/521* (2013.01); *C08L 75/04* (2013.01); *C09K 3/1021* (2013.01); *C09K 21/12* (2013.01); *C08G 2101/00* (2013.01); *C08G 2101/005* (2013.01); *C08G 2101/0083* (2013.01); *C08J 9/0019* (2013.01); *C08J 2375/08* (2013.01); *C08J 2409/00* (2013.01); *C08J 2457/02* (2013.01)

(58) Field of Classification Search
CPC ............................ C08J 9/0019; C08J 9/0038
See application file for complete search history.

(56) References Cited

U.S. PATENT DOCUMENTS

| 4,514,524 A | 4/1985 | Fesman | |
|---|---|---|---|
| 5,510,053 A * | 4/1996 | Narayan | C08G 18/4825 252/182.2 |
| 2003/0130365 A1* | 7/2003 | Eling | C08J 9/0038 521/99 |
| 2006/0264524 A1* | 11/2006 | Abraham | C08G 18/36 521/172 |

FOREIGN PATENT DOCUMENTS

| JP | 60-133018 A | 7/1985 |
|---|---|---|
| JP | 61-26611 A | 2/1986 |
| JP | S-61157514 A * | 7/1986 |
| JP | 1-168719 A | 7/1989 |
| JP | 6-330022 A | 11/1994 |
| JP | 2006-307092 A | 11/2006 |
| JP | 2007-2036 A | 1/2007 |
| JP | 2007-91866 A | 4/2007 |
| JP | 2008-143959 A | 6/2008 |
| JP | 2009-84433 A | 4/2009 |
| JP | 2010-144066 A | 7/2010 |
| JP | 2011-184601 A | 9/2011 |
| JP | 2011-184640 A | 9/2011 |
| JP | 2013-249394 A | 12/2013 |

OTHER PUBLICATIONS

Machine translation of the Detailed Description of JP 2010-144066A to Kawarabayashi obtained from the Japan Patent Office on Mar. 18, 2017.*
Compound Summary for CID 31356 from PubChem, 1 page, Mar. 18, 2017.*
English-language abstract and machine translation of JPS-61157514-A obtained from the European Patent Office on Feb. 22, 2018.*
Int. Search Report dated Mar. 11, 2014 issued in Application No. PCT/JP2013/082265 (PCT/ISA/210).
Written Opinion dated Mar. 11, 2014 issued in Application No. PCT/JP2013/082265 (PCT/ISA/237).
Office Action dated Aug. 4, 2016, issued by the Japanese Patent Office in counterpart Japanese Patent Application No. 2012-203965.

(Continued)

*Primary Examiner* — Melissa A Rioja
(74) *Attorney, Agent, or Firm* — Sughrue Mion, PLLC

(57) ABSTRACT

A flame-retardant sealing material comprising a polyurethane foam formed from a polyurethane raw material containing a polyol component, an isocyanate, a water repellent, a flame retardant and the like, wherein the polyol component contains a hydroxyl-terminated prepolymer obtained by the reaction of a polyether polyol and an isocyanate, the water repellent is a polybutadiene polyol or the like, the flame retardant is (1) a non-halogen non-condensed phosphate ester or (2) a halogen-containing non-condensed phosphate ester, which are liquid at ordinary temperature, and the isocyanate index is 100 to 150.

1 Claim, 2 Drawing Sheets

(56) References Cited

OTHER PUBLICATIONS

Communication dated May 10, 2016 issued by Japanese Intellectual Property Office in counterpart Japanese Patent Application No. 2012-203965.
Office Action dated May 8, 2017, from the State Intellectual Property Office of People's Republic of China in counterpart Chinese Application No. 201380081259.7.

* cited by examiner

[Fig. 1]
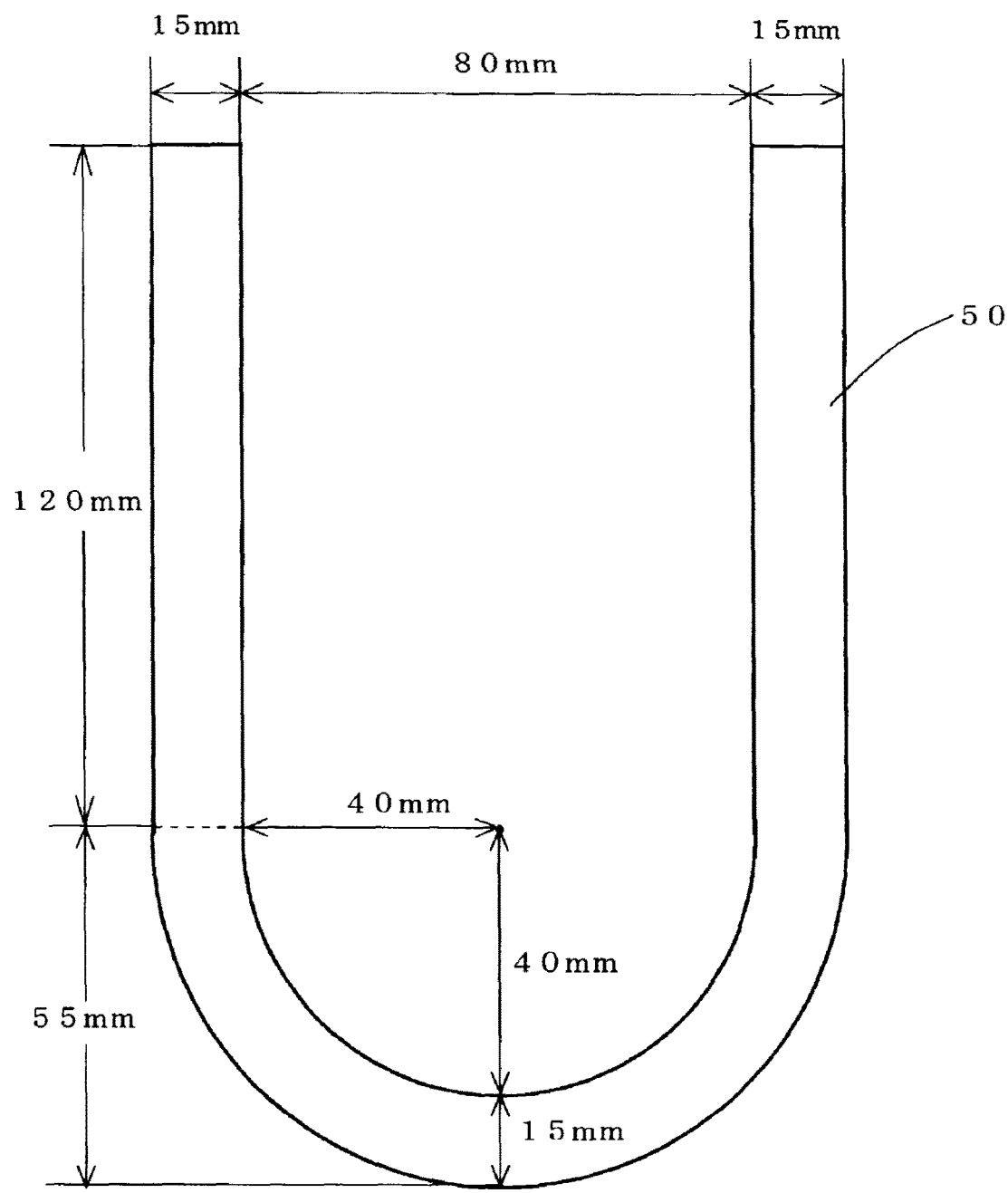

[Fig. 2]
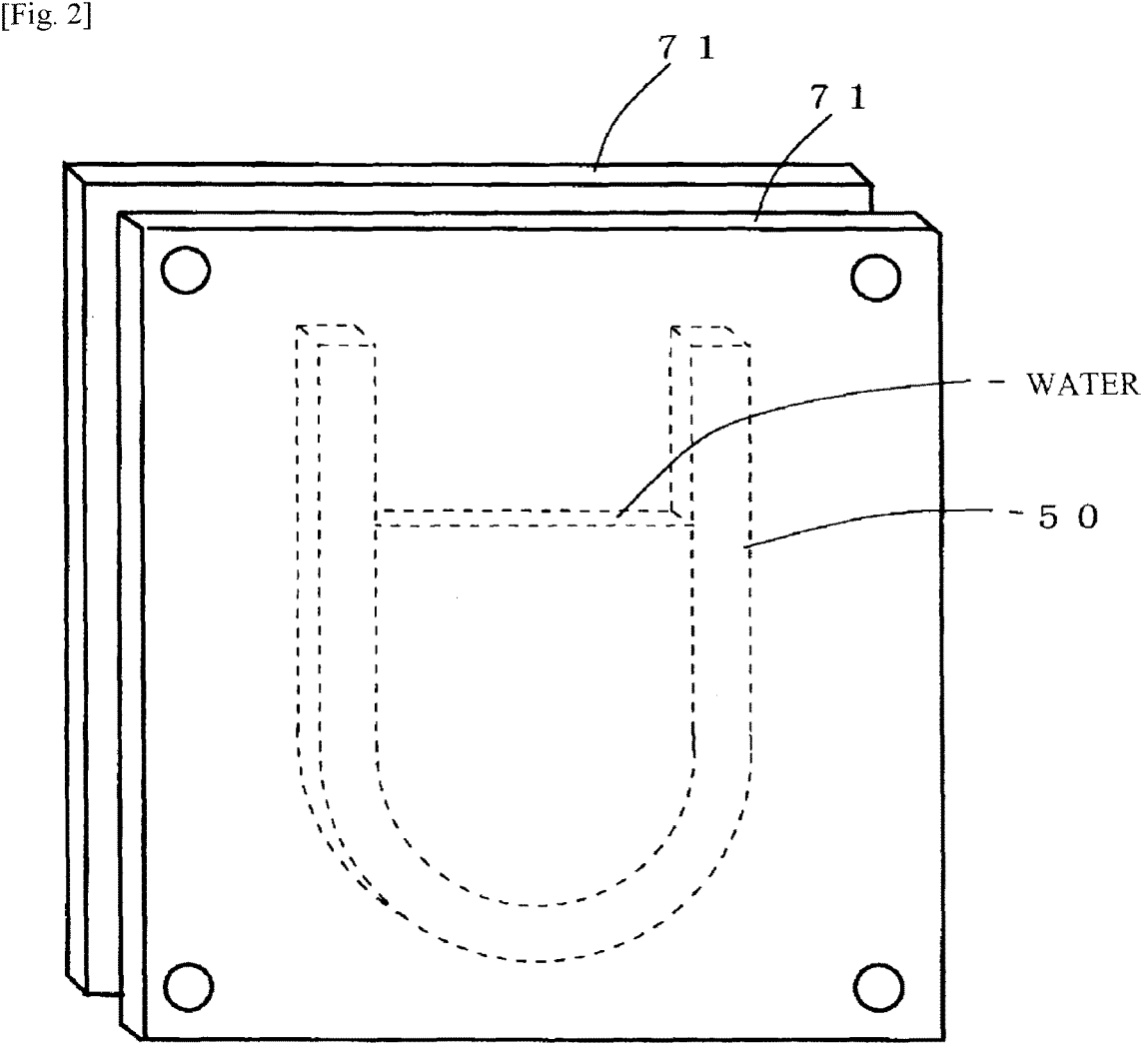

FLAME-RETARDANT SEALING MATERIAL

TECHNICAL FIELD

The invention relates to a flame-retardant sealing material having excellent water cut-off performance.

BACKGROUND ART

Polyurethane foams which cut off water have been used as water-sealing materials. As a conventional polyurethane foam which cuts off water, a polyurethane foam which has high water cut-off property with a holding time of nine hours or longer under water pressure of 100 mmAq and which has a low density of 15 $kg/m^3$ to 40 $kg/m^3$ has been proposed (PTL 1).

The polyurethane foam having high water cut-off property and a low density contains 80 to 100 parts by mass of a hydroxyl-terminated prepolymer obtained by the reaction of a polyether polyol and an isocyanate per 100 parts by mass of the total amount of the polyol and contains a water repellent containing at least one selected from the group consisting of a polybutadiene polyol, a hydrogenated polyol of a polybutadiene, a polyisoprene polyol and a hydrogenated polyol of a polyisoprene, and the isocyanate index is 100 to 150.

However, the flame retardancy of the conventional polyurethane foam having high water cut-off property and a low density has not been examined, and it has been required to improve the flame retardancy thereof for applications which require low flammability, such as a water-sealing material used at a part in an automobile, an OA device or the like where low flammability is required.

Also, as polyurethane foams with low flammability which are used for buffer materials, acoustic materials and the like, non-halogen types which do not use any halogen compound have been proposed recently from the viewpoint of environmental protection. Non-halogen polyurethane foams with low flammability include a polyurethane foam containing a polyol and a phthalate ester polyol and containing melamine powder having a mean particle size of 0.5 μm or less as a flame retardant (PTL 2), a polyurethane foam containing a phthalate ester-based polyol, a phosphate ester-type flame retardant, melamine powder having a mean particle size of 0.1 to 0.5 μm and a hydrate of an inorganic compound (PTL 3) and a polyurethane foam containing melamine and a condensed phosphate ester-type flame retardant (PTL 4).

However, because the conventional polyurethane foams with low flammability which are used for buffer materials, acoustic materials and the like are not used for the purpose of cutting off water, the water cut-off properties have not been examined.

A polyurethane foam is produced by mixing a foaming agent, a catalyst and a flame retardant with a liquid polyol, further mixing a liquid isocyanate therewith to react the polyol and the isocyanate and foaming the materials. A good cell state is not obtained when the materials are not mixed well, and a foaming failure sometimes occurs. For this reason, to obtain a good foam state, all the raw materials used for a polyurethane foam are preferably liquid.

Accordingly, even though it has been attempted to improve the flame retardancy using a flame retardant which is solid at ordinary temperature and which is used for a polyurethane foam with low flammability (for example, melamine) as a raw material of a conventional polyurethane foam which cuts off water or using a solid flame retardant (for example, melamine) and a liquid flame retardant (for example, a condensed phosphate ester-type flame retardant); the amount of the solid flame retardant used has been limited to obtain a foam with a good foam state, and it has not been possible to obtain both excellent water cut-off performance and favorable low flammability.

Moreover, when a condensed phosphate ester-type flame retardant that is liquid at ordinary temperature was used, the water cut-off property under water pressure of around 50 mmAq did not have any problem, but there was a phenomenon that the water cut-off property deteriorated remarkably under water pressure of 100 mmAq.

Thus, it has been impossible to obtain a non-halogen flame-retardant sealing material which has water cut-off property at 100 mmAq and which passes the flammability test according to FMVSS302 (Federal Motor Vehicle Safety Standard No 302). Also, when a liquid phosphate ester-type flame retardant is used, the increase in its amount for the purpose of improving the flame retardancy results in the deterioration of the fogging property and easily causes cloudiness, in case where the material is compressed with a transparent material such as glass. Thus, it has been impossible to obtain a flame-retardant sealing material with good fogging property.

CITATION LIST

Patent Literature

PTL 1: JP-A-2010-144066
PTL 2: JP-A-2007-002036
PTL 3: JP-A-2007-091866
PTL 4: JP-A-2011-184601

SUMMARY OF INVENTION

Technical Problem

The invention has been made in view of the above points, and the invention aims to provide a flame-retardant sealing material having excellent water cut-off performance and excellent flame retardancy (low flammability) and aims to provide a flame-retardant sealing material having good fogging property.

Solution to Problem

The invention is as follows.
(1) A flame-retardant sealing material comprising a polyurethane foam formed from a polyurethane raw material containing a polyol component, an isocyanate, a foaming agent, a catalyst, a water repellent and a flame retardant,
wherein the polyol component contains 80 to 100 parts by mass of a hydroxyl-terminated prepolymer obtained by the reaction of a polyether polyol and an isocyanate per 100 parts by mass,
the water repellent contains at least one selected from the group consisting of a polybutadiene polyol, a hydrogenated polyol of a polybutadiene, a polyisoprene polyol and a hydrogenated polyol of a polyisoprene,
the flame retardant is a non-halogen non-condensed phosphate ester that is liquid at ordinary temperature, or a halogen-containing non-condensed phosphate ester that is liquid at ordinary temperature, and
the isocyanate index is 100 to 150.

(2) The flame-retardant sealing material according to the (1) above, which comprises the flame retardant in an amount of 3 to 25 parts by mass per 100 parts by mass of the polyol component.
(3) The flame-retardant sealing material according to the (1) above, wherein the flame retardant is the non-halogen non-condensed phosphate ester that is liquid at ordinary temperature, and the flame-retardant sealing material comprises the flame retardant in an amount of 6 to 13 parts by mass per 100 parts by mass of the polyol component.
(4) The flame-retardant sealing material according to the (1) above, wherein the flame retardant is a halogen-containing non-condensed phosphate ester that is liquid at ordinary temperature and that has a weight average molecular weight of 400 or more, and the flame-retardant sealing material comprises the flame retardant in an amount of 3 to 25 parts by mass per 100 parts by mass of the polyol component.

Advantageous Effects of Invention

The polyol component of the flame-retardant sealing material of the invention contains a hydroxyl-terminated prepolymer obtained by the reaction of a polyether polyol and an isocyanate alone or a mixture of the hydroxyl-terminated prepolymer and another polyol. Because the hydroxyl-terminated prepolymer obtained by the reaction of a polyether polyol and an isocyanate is contained in an amount of 80 to 100 parts by mass per 100 parts by mass of the polyol component, the viscosity of the polyurethane raw material is high, and the cells become fine during the foam formation. Moreover, because the amount of the film (mirror) covering the cell framework of the polyurethane foam increases, the permeability reduces, and it becomes difficult for water to enter the cells, resulting in the improvement of the water cut-off property. When polyether polyols are used as the hydroxyl-terminated prepolymer and the polyol other than the hydroxyl-terminated prepolymer, which constitute the polyol component, the hydrolysis resistance is good because the polyol component contains polyether polyols only.

For the flame-retardant sealing material of the invention, at least one selected from the group consisting of a polybutadiene polyol, a hydrogenated polyol of a polybutadiene, a polyisoprene polyol and a hydrogenated polyol of a polyisoprene is used as the water repellent. Thus, the water repellent is incorporated into the resin framework of the foam, and the water repellent does not bleed. Also, the risk of the deterioration of the foam with time or the deterioration of the water repellency is low, and good water cut-off property can last for a long period of time. Moreover, because the isocyanate index is 100 to 150, the polyol component and the water repellent resinify completely, and secondary crosslinking reaction (allophanate bond, biuret bond or the like) of the isocyanate occurs because the isocyanate is in an excessive amount. Also, the water repellency of the foam further improves, and the water cut-off property further improves.

Because a non-halogen non-condensed phosphate ester that is liquid at ordinary temperature or a halogen-containing non-condensed phosphate ester that is liquid at ordinary temperature is used as the flame retardant, the flame-retardant sealing material of the invention has high water cut-off property under water pressure of 100 mmAq without the deterioration of the water cut-off property and has excellent flame retardancy that passes the flammability test according to FMVSS302. Moreover, when the flame retardant is contained in an amount of 3 to 25 parts by mass per 100 parts by mass of the polyol component, the effects further improve.

More specifically, the flame retardant is contained in an amount of 6 to 13 parts by mass per 100 parts by mass of the polyol component when a non-halogen non-condensed phosphate ester that is liquid at ordinary temperature is used as the flame retardant, while the flame retardant is contained in an amount of 3 to 25 parts by mass per 100 parts by mass of the polyol component when a halogen-containing non-condensed phosphate ester that is liquid at ordinary temperature is used as the flame retardant. In this manner, the effects further improve.

When the halogen-containing non-condensed phosphate ester has a weight average molecular weight of 400 or more, the flame retardancy can be improved even when the amount of the halogen-containing non-condensed phosphate ester is low, and the deterioration of the fogging property, which is caused when the amount of the liquid phosphate ester is increased to improve the flame retardancy, can be prevented.

BRIEF DESCRIPTION OF DRAWINGS

FIG. 1 A plane view of a sample for measuring the water cut-off property.
FIG. 2 A figure which illustrates the method for measuring the water cut-off property

DESCRIPTION OF EMBODIMENTS

The invention is explained in detail below.
In the present description, the flame-retardant sealing material of the invention is sometimes referred to as a water-sealing material.
The flame-retardant sealing material of the invention contains a polyurethane foam formed from a polyurethane raw material containing a polyol component, an isocyanate, a foaming agent, a catalyst, a water repellent and a flame retardant.
The polyol component contains 80 to 100 parts by mass of a hydroxyl-terminated prepolymer obtained by the reaction of a polyether polyol and an isocyanate per 100 parts by mass of the polyol component. Since the hydroxyl-terminated prepolymer is contained in an amount of 80 to 100 parts by mass, the viscosity of the raw material of the polyurethane foam is high, and the cells become fine during the foam formation. Moreover, because the amount of mirror covering the cell framework of the polyurethane foam increases and the permeability reduces, the water cut-off property improves. When the amount of the hydroxyl-terminated prepolymer is lower than the above range, it becomes difficult to make the cells of the polyurethane foam fine and reduce the permeability, and the water cut-off property deteriorates.

The polyether polyol used for producing the hydroxyl-terminated prepolymer in the invention is a bi- or higher functional polyether polyol, and a tri- or higher functional polyether polyol is preferable to obtain a polyurethane foam with finer cells. The bi- or higher functional polyether polyol is not particularly limited, and for example, a polyether polyol obtained by adding an alkylene oxide such as ethylene oxide or propylene oxide to a starting material such as ethylene glycol, propylene glycol, diethylene glycol, dipropylene glycol, hydroquinone, water, resorcin, bisphenol A, hydrogenated bisphenol A, glycerin, trimethylolpropane, pentaerythritol, monoethanolamine, diethanolamine, triethanolamine, tripropanolamine, ethylenediamine, 1,6-hexanediamine, tolylenediamine, diphenylmethane diamine, triethylene tetramine, sorbitol, mannitol or dulcitol or the like can be used.

The isocyanate used for producing the hydroxyl-terminated prepolymer in the invention is a bi- or higher functional isocyanate. The bi- or higher functional isocyanate is not particularly limited and may be any of aromatic, alicyclic and aliphatic isocyanates. One of the isocyanates may be used alone or a combination of two or more thereof may be used.

Examples of the bifunctional isocyanate include aromatic isocyanates such as 2,4-tolylene diisocyanate, 2,6-tolylene diisocyanate, m-phenylene diisocyanate, p-phenylene diisocyanate, 4,4'-diphenylmethane diisocyanate, 2,4'-diphenylmethane diisocyanate, 2,2'-diphenylmethane diisocyanate, xylylene diisocyanate, 3,3'-dimethyl-4,4'-biphenylene diisocyanate or 3,3'-dimethoxy-4,4'-biphenylene diisocyanate, alicyclic isocyanates such as cyclohexane-1,4-diisocyanate, isophorone diisocyanate, dicyclohexylmethane-4,4'-diisocyanate or methylcyclohexane diisocyanate, and aliphatic isocyanates such as butane-1,4-diisocyanate, hexamethylene diisocyanate, isopropylene diisocyanate, methylene diisocyanate or lysine isocyanate.

Examples of the tri- or higher functional isocyanate include tris(4-phenylisocyanate) thiophosphite, triphenylmethane triisocyanate, tolylene diisocyanate trimer, polymethylene polyphenyl isocyanate and diphenylether-2,4,4'-triisocyanate as well as polyfunctional aromatic isocyanates, polyfunctional aliphatic isocyanates, block-type isocyanates and the like.

The hydroxyl-terminated prepolymer is obtained by a known method for producing a prepolymer from the polyether polyol and the isocyanate. Specifically, the hydroxyl-terminated prepolymer can be obtained by introducing a given amount of the polyether polyol to a tank which has been heated to a given temperature (for example, 80° C.), introducing given amounts of the isocyanate and a known catalyst for a polyurethane foam described below while stirring the tank which is filled with nitrogen and reacting the materials.

The polyol used for producing the hydroxyl-terminated prepolymer is a polyether polyol having a molecular weight of 300 to 10000, more preferably a molecular weight of 1000 to 8000, and further preferably a molecular weight of 2000 to 5000. The isocyanate used for producing the hydroxyl-terminated prepolymer is not particularly limited as long as the production does not become difficult due to the viscosity of the hydroxyl-terminated prepolymer, but tolylene diisocyanate is effective. The viscosity of the hydroxyl-terminated prepolymer at 30° C. is 2000 to 30000 mPa·s, more preferably 4000 to 28000 mPa·s, and further preferably 8000 to 25000 mPa·s.

When the amount of the hydroxyl-terminated prepolymer contained per 100 parts by mass of the polyol component is less than 100 parts by mass, the polyol used in combination for the polyol component is not particularly limited, and a polyether polyol, a polymer polyol obtained by graft polymerization of a polyether polyol and styrene, acrylonitrile or the like, a polyether ester polyol or a polyester polyol may be used. In particular, a polyether polyol is preferable, and the polyether polyol used as a raw material for producing the hydroxyl-terminated prepolymer is more preferably used in combination. Also, when a polyester polyol is used as the polyol used in combination for the polyol component, to obtain a flame-retardant sealing material having excellent hydrolysis resistance, a bi- or higher functional polyester polyol obtained by condensation of a branched diol such as 3-methyl-1,5-pentanediol or 2-methyl-1,8-octanediol and a dicarboxylic acid such as adipic acid (aliphatic acid), a dimer acid (alicyclic acid) or phthalic acid (aromatic acid), a polyester polyol obtained by ring-opening polymerization of a polycarbonate diol or a lactone such as caprolactone and the like are preferable.

As the isocyanate which is reacted with the polyol component, one of known aromatic, alicyclic and aliphatic isocyanates for a polyurethane foam is used alone, or a combination of two or more thereof is used. Examples of the aromatic isocyanate include 2,4-tolylene diisocyanate, 2,6-tolylene diisocyanate, m-phenylene diisocyanate, p-phenylene diisocyanate, 4,4'-diphenylmethane diisocyanate, 2,4'-diphenylmethane diisocyanate, 2,2'-diphenylmethane diisocyanate, xylylene diisocyanate, 3,3'-dimethyl-4,4'-biphenylene diisocyanate, 3,3'-dimethoxy-4,4'-biphenylene diisocyanate and the like; examples of the alicyclic isocyanate include cyclohexane-1,4-diisocyanate, isophorone diisocyanate, dicyclohexylmethane-4,4'-diisocyanate, methylcyclohexane diisocyanate and the like; and examples of the aliphatic isocyanate include cyclohexane-1,4-diisocyanate, isophorone diisocyanate, dicyclohexylmethane-4,4'-diisocyanate, methylcyclohexane diisocyanate and the like.

Water is preferable as the foaming agent. The amount is preferably around 1.5 to 6 parts by mass per 100 parts by mass of the polyol component, and the amount is particularly preferably 3 to 5 parts by mass. When the amount is less than 1.5 parts by mass, the deformation following the object to be sealed deteriorates and the sealing property deteriorates, while the heating value is high and the formation is difficult when the amount is more than 6 parts by mass.

As the catalyst, known catalysts for a polyurethane foam can be used, and examples include amine catalysts such as triethylamine, triethylenediamine, diethanolamine, dimethylamino morpholine, N-ethyl morpholine or tetramethylguanidine, tin catalysts such as stannous octoate or dibutyltin dilaurate and metal catalysts such as phenylmercury propionate or lead octenoate (also called organometallic catalysts). The general amount of the catalyst is around 0.2 to 5 parts by mass per 100 parts by mass of the polyol.

The water repellent contains at least one selected from the group consisting of a polybutadiene polyol, a hydrogenated polyol of a polybutadiene, a polyisoprene polyol and a hydrogenated polyol of a polyisoprene. The polyol used as the water repellent has a molecular weight of 500 to 6000, more preferably a molecular weight of 1000 to 5000, and further preferably a molecular weight of 1000 to 3500, and the polyol has a hydroxyl value of 15 to 120 mgKOH/g, more preferably a hydroxyl value of 25 to 110 mgKOH/g, and further preferably a hydroxyl value of 35 to 70 mgKOH/g. The number of the functional groups is 1.6 or more, and more preferably two or more. When the polyol is used as the water repellent, the water repellent is incorporated into the resin framework, and the risk of the deterioration of the foam with time or the deterioration of the water repellency due to bleeding of the water repellent is low. Also, good water cut-off property can last for a long period of time. The polyol of the water repellent is independent from the polyol component, and the amount per 100 parts by mass of the polyol component is preferably 3 to 35 parts by mass, more preferably 5 to 20 parts by mass, and further preferably 10 to 15 parts by mass. When the amount is less than 3 parts by mass, the effect of improving the water cut-off performance is sometimes small, while sometimes the effect of further improving the water cut-off property is not obtained even when the polyol is added in an amount exceeding 35 parts by mass.

A polyurethane foam which is generally used as a sealing material is compressed between different materials such as metal and a thermoplastic resin or a thermosetting resin when the polyurethane foam is used. Thus, the sealing material itself should closely adhere to both of metal and the resin. In the actual use, when the polyurethane foam contains a compound which can form a volatile organic compound (VOC), the compound sometimes has adverse effects, such as chemical attack or bleeding, on the metal surface or the resin surface. Also, when a polyurethane foam is compressed between transparent materials such as glass and is used, defects such as cloudiness like fogging are caused.

By selecting the water repellent of the flame-retardant sealing material of the invention, the eluted material amount is very low, namely 5% or less, in the Soxhlet extraction method using acetone (extraction time of eight hours), and the defects are not caused. The eluted material amounts of the sealing materials which are generally used at present are around 10 to 15%, and the eluted material amount of the invention of 5% or less is substantially comparable to the performance of general-purpose polyurethane foams containing no water repellent.

As the flame retardant, a non-halogen non-condensed phosphate ester that is liquid at ordinary temperature or a halogen-containing non-condensed phosphate ester that is liquid at ordinary temperature is used.

The amount of the flame retardant added is preferably 3 to 25 parts by mass per 100 parts by mass of the polyol component. When the amount is less than 3 parts by mass, the flame-retardant sealing material sometimes fails in the flammability test according to FMVSS302 while when the amount is more than 25 parts by mass, water sometimes leaks in shorter than nine hours in the water cut-off property test under water pressure of 100 mmAq and sometimes good water cut-off property cannot be obtained under water pressure of 100 mmAq.

Examples of the non-halogen non-condensed phosphate ester that is liquid at ordinary temperature include trialkyl phosphates (aliphatic phosphate esters) such as trimethyl phosphate, triethyl phosphate, tripropyl phosphate and tributyl phosphate, triaryl phosphates (aromatic phosphate esters) such as triphenyl phosphate, tricresyl phosphate, trixylenyl phosphate and cresyl diphenyl phosphate and the like. In particular, of triaryl phosphates (aromatic phosphate esters), isopropylated triaryl phosphate is preferable.

When the non-halogen non-condensed phosphate ester that is liquid at ordinary temperature is used as the flame retardant, the amount of the flame retardant added is preferably 6 to 13 parts by mass per 100 parts by mass of the polyol component. When the amount is less than 6 parts by mass, the flame-retardant sealing material sometimes fails in the flammability test according to FMVSS302, while when the amount is more than 13 parts by mass, water sometimes leaks in shorter than nine hours in the water cut-off property test under water pressure of 100 mmAq and sometimes good water cut-off property cannot be obtained under water pressure of 100 mmAq.

The condensed phosphate esters which have been used as flame retardants are generally apt to be hydrolyzed, and it is speculated that the condensed phosphate esters are decomposed easily by heat and moisture during foaming. The decomposition product generated deteriorates the water cut-off performance remarkably. On the other hand, the halogen-containing non-condensed phosphate ester that is liquid at ordinary temperature is not easily decomposed, and thus it is believed that the water cut-off performance is less likely to deteriorate. The halogen-containing non-condensed phosphate ester is apt to volatilize when the molecular weight is small, and the fogging property deteriorates (apt to cause cloudiness). Thus, the weight average molecular weight is preferably 400 or more. In particular, tris(1,3-dichloro-2-propyl) phosphate is preferable as the flame retardant in the invention.

When the halogen-containing non-condensed phosphate ester that is liquid at ordinary temperature is used as the flame retardant, the amount of the flame retardant added is preferably 3 to 25 parts by mass per 100 parts by mass of the polyol component. When the amount is less than 3 parts by mass, the flame-retardant sealing material sometimes fails in the flammability test according to FMVSS302, while when the amount is more than 25 parts by mass, water sometimes leaks in shorter than nine hours in the water cut-off property test under water pressure of 100 mmAq and sometimes good water cut-off property cannot be obtained under water pressure of 100 mmAq. Moreover, when the amount of the flame retardant added is within the range of 3 to 12 parts by mass per 100 parts by mass of the polyol component, further improved fogging property in addition to the high water cut-off property and the excellent flame retardancy can be obtained.

The isocyanate index is 100 to 150, more preferably 105 to 140, and further preferably 110 to 130. When the isocyanate index is 100 to 150, the polyol component and the water repellent resinify completely, and secondary crosslinking reaction (allophanate bond, biuret bond or the like) of the isocyanate occurs because the isocyanate is in an excessive amount. Also, the water repellency of the foam further improves, and the water cut-off property further improves. When the isocyanate index is less than 100, the water cut-off performance deteriorates. It is not necessary to particularly limit the upper limit of the isocyanate index. However, when the isocyanate index exceeds 150, the temperature of heat generated in the polyurethane foam becomes high during foaming (especially, when a soft slab foam is formed), and there is a risk of scorching or spontaneous combustion. In this regard, the isocyanate index is an index used in the field of polyurethane and is a value of the equivalent ratio of the isocyanate groups of the polyisocyanate to the active hydrogen groups in the raw material (for example, the active hydrogen groups contained in the hydroxyl groups of the polyol, the active hydrogen groups of water or the like as the foaming agent and the like) in terms of percentage [equivalent of NCO groups/equivalent of active hydrogen groups× 100].

In addition, additives such as a foam stabilizer and a pigment can be added suitably. The foam stabilizer is a foam stabilizer which is used for a polyurethane foam and may be a silicone-type foam stabilizer, a fluorine-containing compound-type foam stabilizer or a known surfactant. A pigment in accordance with the desired color is used.

The polyurethane foam is produced by a known foaming method in which a polyurethane raw material containing the polyol component, the isocyanate, the foaming agent, the catalyst, the water repellent, the flame retardant and the optional additives is stirred and mixed to react the polyol component and the isocyanate and the material is foamed. The density of the polyurethane foam in the invention is preferably 15 to 40 kg/m$^3$, and in particular, the density is more preferably 20 to 35 kg/m$^3$. When the density of the polyurethane foam is 15 to 40 kg/m$^3$, the costs of the materials can be reduced because excellent water cut-off performance and low flammability can be obtained at a low density, and the weight of the flame-retardant sealing material can be reduced.

The flame-retardant sealing material of the invention is used after being processed into a thickness and a shape (for example, string) according to the use by punching or the like. The flame-retardant sealing material of the invention has a holding time of nine hours or longer, and more preferably 24 hours or longer, under water pressure of 100 mmAq and has very good water cut-off property. The holding time under water pressure of 100 mmAq is the period of time during which the water pressure of 100 mmAq is maintained when a sample for measuring the water cut-off property 50 prepared by punching an U-shaped form with the size shown in FIG. 1 out of a flame-retardant sealing material with a thickness of 10 mm is interposed between two acrylic resin plates 71 and 71 in the 50% compression state as shown in FIG. 2 and water is introduced in the U-shaped test sample 50 in such a manner that the water pressure becomes 100 mmAq.

Also, the flame-retardant sealing material of the invention has low flammability which passes the FMVSS302 flammability test. In the FMVSS302 flammability test, the average burn rate and the maximum burn rate of 10 test pieces are measured, and the sample is considered to pass the test when any one of the following (1) to (3) applies.

(1) The test piece does not burn, or the test piece burns but the fire goes out before reaching the reference line for start of burning (burn rate of 0). (2) The fire goes beyond the reference line for start of burning, but the fire goes out within 50.8 mm from the reference line for start of burning and within 60 seconds (self-extinction (SE)). (3) The fire goes beyond the reference line for start of burning, and the burn rate is 100 mm/min or less.

EXAMPLES

The results of the evaluation tests using the Examples of the invention and the Comparative Examples are shown below, and the invention is explained in further detail. In this regard, however, the invention is not limited to these Examples.

Examples 1-1 to 1-20 and Comparative Examples 1-1 to 1-11

Water-sealing materials containing the polyurethane foams of the Examples and the Comparative Examples were prepared using polyurethane raw materials with the compositions shown in Table 1-1 and Table 1-2. The components in Table 1-1 and Table 1-2 are as follows. In Table 1-1 and Table 1-2, the foaming property is A when a good foam was obtained, and the foaming property is B when the foam was poor or could not be obtained.

Polyol A1: hydroxyl-terminated prepolymer synthesized by reacting a mixture of polyol A2 below/the isocyanate below=2 mol/1 mol in the presence of a metal catalyst at 80° C. for about two hours, hydroxyl value of 33 mgKOH/g, viscosity of 17000 mPa·s (30° C.)

Polyol A2: polyether polyol, molecular weight of 3000, number of functional groups of 3, hydroxyl value of 56 mgKOH/g, product name GP-3000, manufactured by Sanyo Chemical Industries, Ltd.

Polyol A3: polyester polyol, molecular weight of 2000, number of functional groups of 3, hydroxyl value of 84 mgKOH/g, product name F-2010 (obtained by condensation polymerization of trimethylolpropane with 3-methyl-1,5-pentanediol and adipic acid), manufactured by Kuraray Co., Ltd.

Water repellent C1: polybutadiene polyol, Mw=2100, number of functional groups of 2, product name KRASOL LBH-P2000, manufactured by Cray Valley Water repellent C2: hydrogenated polybutadiene polyol, Mw=3100, number of functional groups of 2, product name HLBH-P3000, manufactured by Cray Valley Water repellent C3: polybutadiene polyol, Mw=1200, number of functional groups of 2.3, product name R-15HT, manufactured by Idemitsu Kosan Co., Ltd.

Water repellent C4: isoprene polyol, Mw=2500, number of functional groups of 2.1, product name Roly ip, manufactured by Idemitsu Kosan Co., Ltd.

Water repellent C5: hydrogenated isoprene polyol, Mw=2500, number of functional groups of 2.3, product name Epol, manufactured by Idemitsu Kosan Co., Ltd.

Water repellent C6: petroleum liquid resin, product name SAS-LH, manufactured by Nippon Oil Corporation Foaming agent D: water Foam stabilizer E: silicone-type, product name SZ-1919, manufactured by Dow Corning Toray Co., Ltd.

Catalyst F1-1: reactive tertiary amine, product name Kaolizer No. 51, manufactured by Kao Corporation Catalyst F2: stannous octylate, product name MRH-110, manufactured by Johoku Chemical Co., Ltd.

Flame retardant G1-1: isopropylated triaryl phosphate, product name REOFOS 35, viscosity of 44 mm$^2$/s, 25° C., manufactured by Ajinomoto Fine-Techno Co., Inc.

Flame retardant G1-2: isopropylated triaryl phosphate, product name REOFOS 50, viscosity of 50 mm$^2$/s, 25° C., manufactured by Ajinomoto Fine-Techno Co., Inc.

Flame retardant G1-3: isopropylated triaryl phosphate, product name REOFOS 65, viscosity of 61 mm$^2$/s, 25° C., manufactured by Ajinomoto Fine-Techno Co., Inc.

Flame retardant G1-4: isopropylated triaryl phosphate, product name REOFOS 95, viscosity of 93 mm$^2$/s, 25° C., manufactured by Ajinomoto Fine-Techno Co., Inc.

Flame retardant G1-5: isopropylated triaryl phosphate, product name REOFOS 110, viscosity of 120 mm$^2$/s, 25° C., manufactured by Ajinomoto Fine-Techno Co., Inc.

Flame retardant G1-6: aliphatic condensed phosphate ester, product name DAIGUARD-880 manufactured by Daihachi Kogyo Co., Ltd.

Flame retardant G1-7: condensed phosphate ester, product name fyrol PNX-S, manufactured by ICL-IP Isocyanate: 2,4-TDI/2,6-TD1=80/20, product name T-80, manufactured by Nippon Polyurethane Industry Co., Ltd.

In Table 1-1 and Table 1-2 below, catalyst F1-1, flame retardants G1-1 to G1-7, Examples 1-1 to 1-20 and Comparative Examples 1-1 to 1-11 are simply referred to as F1, G1 to G7, Examples 1 to 20 and Comparative Examples 1 to 11, respectively.

TABLE 1-1

(The values of the components are parts by mass.)

| | | Example | | | | | | | | | |
|---|---|---|---|---|---|---|---|---|---|---|---|
| | | 1 | 2 | 3 | 4 | 5 | 6 | 7 | 8 | 9 | 10 |
| Polyol component | A1 | 100 | 100 | 100 | 100 | 100 | 100 | 100 | 100 | 100 | 100 |
| | A2 | | | | | | | | | | |
| Water repellent C | C1 | 12 | 12 | 12 | 12 | 12 | 12 | 12 | 12 | | |
| | C2 | | | | | | | | | 12 | |
| | C3 | | | | | | | | | | 12 |
| | C4 | | | | | | | | | | |
| | C5 | | | | | | | | | | |
| | C6 | | | | | | | | | | |
| Foaming agent D | | 3.6 | 3.6 | 3.6 | 3.6 | 3.6 | 3.6 | 3.6 | 3.6 | 3.6 | 3.6 |
| Foam stabilizer E | E1 | 1 | 1 | 1 | 1 | 1 | 1 | 1 | 1 | 1 | 1 |
| Catalyst F | F1 | 0.3 | 0.3 | 0.3 | 0.3 | 0.3 | 0.3 | 0.3 | 0.3 | 0.3 | 0.3 |
| | F2 | 0.3 | 0.3 | 0.3 | 0.3 | 0.3 | 0.3 | 0.3 | 0.3 | 0.3 | 0.3 |
| Flame retardant G | G1 | | | | 10 | | | | | | |
| | G2 | | | | | 10 | | | | | |
| | G3 | 6 | 10 | 13 | | | | | 10 | 10 | 10 |
| | G4 | | | | | | 10 | | | | |
| | G5 | | | | | | | 10 | | | |
| | G6 | | | | | | | | | | |
| | G7 | | | | | | | | | | |
| Isocyanate | | 50.1 | 50.1 | 50.1 | 50.1 | 50.1 | 50.1 | 50.1 | 50.1 | 49.7 | 51.0 |
| Isocyanate index | | 120 | 120 | 120 | 120 | 120 | 120 | 120 | 120 | 120 | 120 |
| Foaming property | | A | A | A | A | A | A | A | A | A | A |
| Density | kg/m$^3$ | 28 | 29 | 30 | 29 | 29 | 29 | 29 | 29 | 28 | 29 |
| 25 mmAq water cut-off property | | A | A | A | A | A | A | A | A | A | A |
| 50 mmAq water cut-off property | | A | A | A | A | A | A | A | A | A | A |
| 100 mmAq water cut-off property | | AA | AA | AA | AA | AA | AA | AA | AA | AA | AA |
| 100 mmAq water leakage time | | 24< | 24< | 24< | 24< | 24< | 24< | 24< | 24< | 24< | 24< |
| FMVSS302 flame retardancy | | A | A | A | A | A | A | A | A | A | A |

| | | Example | | | | | | | | | |
|---|---|---|---|---|---|---|---|---|---|---|---|
| | | 11 | 12 | 13 | 14 | 15 | 16 | 17 | 18 | 19 | 20 |
| Polyol component | A1 | 100 | 100 | 100 | 100 | 100 | 100 | 100 | 100 | 100 | 80 |
| | A2 | | | | | | | | | | 20 |
| Water repellent C | C1 | | | 3 | 35 | 12 | 12 | 12 | 12 | 12 | 12 |
| | C2 | | | | | | | | | | |
| | C3 | | | | | | | | | | |
| | C4 | 12 | | | | | | | | | |
| | C5 | | 12 | | | | | | | | |
| | C6 | | | | | | | | | | |
| Foaming agent D | | 3.6 | 3.6 | 3.6 | 3.6 | 3.6 | 3.6 | 3.6 | 4.0 | 3.2 | 3.6 |
| Foam stabilizer E | E1 | 1 | 1 | 1 | 1 | 1 | 1 | 1 | 1 | 1 | 1 |
| Catalyst F | F1 | 0.3 | 0.3 | 0.3 | 0.3 | 0.3 | 0.3 | 0.3 | 0.3 | 0.3 | 0.3 |
| | F2 | 0.3 | 0.3 | 0.3 | 0.3 | 0.3 | 0.3 | 0.3 | 0.3 | 0.3 | 0.3 |
| Flame retardant G | G1 | | | | | | | | | | |
| | G2 | | | | | | | | | | |
| | G3 | 10 | 10 | 10 | 10 | 10 | 10 | 10 | 10 | 10 | 10 |
| | G4 | | | | | | | | | | |
| | G5 | | | | | | | | | | |
| | G6 | | | | | | | | | | |
| | G7 | | | | | | | | | | |
| Isocyanate | | 49.9 | 49.9 | 49.2 | 52.4 | 41.8 | 45.9 | 62.6 | 54.7 | 45.6 | 51.0 |
| Isocyanate index | | 120 | 120 | 120 | 120 | 100 | 110 | 150 | 120 | 120 | 120 |
| Foaming property | | A | A | A | A | A | A | A | A | A | A |
| Density | kg/m$^3$ | 29 | 29 | 24 | 40 | 30 | 30 | 35 | 22 | 39 | 31 |
| 25 mmAq water cut-off property | | A | A | A | A | A | A | A | A | A | A |
| 50 mmAq water cut-off property | | A | A | A | A | A | A | A | A | A | A |
| 100 mmAq water cut-off property | | AA | AA | A | AA | A | AA | AA | AA | AA | A |
| 100 mmAq water leakage time | | 24< | 24< | 18 | 24< | 9 | 24< | 24< | 24< | 24< | 13 |
| FMVSS302 flame retardancy | | A | A | A | A | A | A | A | A | A | A |

TABLE 1-2

(The values of the components are parts by mass.)

| | | Comparative Example | | | | | | | | | |
|---|---|---|---|---|---|---|---|---|---|---|---|
| | | 1 | 2 | 3 | 4 | 5 | 6 | 7 | 8 | 9 | 10 | 13 |
| Polyol component | A1 | 100 | 100 | 100 | 100 | 100 | 100 | 100 | | 75 | 100 | 100 |
| | A2 | | | | | | | | 100 | 25 | | |
| Water repellent C | C1 | 12 | 12 | 12 | 12 | 12 | 12 | | 12 | 12 | 12 | |
| | C2 | | | | | | | | | | | |
| | C3 | | | | | | | | | | | |
| | C4 | | | | | | | | | | | |
| | C5 | | | | | | | | | | | |
| | C6 | | | | | | | | | | | 25 |
| Foaming agent D | | 3.6 | 3.6 | 3.6 | 3.6 | 3.6 | 3.6 | 3.6 | 3.6 | 3.6 | 3.6 | 3.6 |
| Foam stabilizer E | E1 | 1 | 1 | 1 | 1 | 1 | 1 | 1 | 1 | 1 | 1 | 1 |
| Catalyst F | F1 | 0.3 | 0.3 | 0.3 | 0.3 | 0.3 | 0.3 | 0.3 | 0.3 | 0.3 | 0.3 | 0.3 |
| | F2 | 0.3 | 0.3 | 0.3 | 0.3 | 0.3 | 0.3 | 0.3 | 0.3 | 0.3 | 0.3 | 0.3 |
| Flame retardant G | G1 | | | | | | | | | | | |
| | G2 | | | | 5 | | | | | | | |
| | G3 | | 5 | 15 | | | | 10 | 10 | 10 | 10 | 10 |
| | G4 | | | | | | | | | | | |
| | G5 | | | | | | | | | | | |
| | G6 | | | | 2 | 5 | | | | | | |
| | G7 | | | | | | 10 | | | | | |
| Isocyanate | | 50.1 | 50.1 | 50.1 | 50.1 | 50.1 | 50.1 | 48.9 | 54.4 | 51.2 | 39.7 | 48.9 |
| Isocyanate index | | 120 | 120 | 120 | 120 | 120 | 120 | 120 | 120 | 120 | 95 | 120 |
| Foaming property | | A | A | A | A | A | B | A | A | A | A | A |
| Density | kg/m³ | 28 | 29 | 30 | 28 | 28 | — | 28 | 30 | 31 | 29 | 35 |
| 25 mmAq water cut-off property | | A | A | A | A | A | — | B | B | A | B | A |
| 50 mmAq water cut-off property | | A | A | A | B | B | — | B | B | B | B | B |
| 100 mmAq water cut-off property | | AA | AA | B | B | B | — | B | B | B | B | B |
| 100 mmAq water leakage time | | 24< | 24< | 6 | 1 | 1 | — | 1 | <1 | 5 | <1 | 4 |
| FMVSS302 flame retardancy | | B | B | A | A | A | — | A | A | A | A | A |

The density (kg/m³, JIS K 7222), the water cut-off property and the flame retardancy of each water-sealing material of the Examples and the Comparative Examples were measured. The water cut-off property was measured by the method shown in FIG. 1 and FIG. 2 under water pressure of 25 mmAq, water pressure of 50 mmAq and water pressure of 100 mmAq. The water cut-off property under water pressure of 25 mmAq was determined to pass (A) when water did not leak for 24 hours or longer after introducing water to the water-sealing material 50 from above in such a manner that the water pressure became 25 mmAq, and the water cut-off property was determined to fail (B) when water leaked in shorter than 24 hours. The water cut-off property under water pressure of 50 mmAq was determined to pass (A) when water did not leak for 24 hours or longer after introducing water to the water-sealing material 50 from above in such a manner that the water pressure became 50 mmAq, and the water cut-off property was determined to fail (B) when water leaked in shorter than 24 hours. The water cut-off property under water pressure of 100 mmAq was determined to be the best (AA) when water did not leak for 24 hours or longer after introducing water to the water-sealing material 50 from above in such a manner that the water pressure became 100 mmAq; the water cut-off property was determined to pass (A) when water did not leak for nine hours or longer and shorter than 24 hours; and the water cut-off property was determined to fail (B) when water leaked in shorter than nine hours. In accordance with the FMVSS302 flammability test, the average burn rate and the maximum burn rate of 10 test pieces were measured. The flame retardancy was determined to pass (A) when any one of the criteria (1) to (3) was satisfied, and the flame retardancy was determined to fail (B) when none of the criteria was satisfied. The results of the measurement are shown at the bottom of Table 1-1 and Table 1-2.

As shown by the measurement results in Table 1-1, the non-halogen water-sealing materials of the Examples all passed the water cut-off property test under water pressure of 100 mmAq and passed the FMVSS302 flammability test with respect to the flame retardancy.

On the contrary, Comparative Example 1-1 shown in Table 1-2 is an example using no flame retardant, and Comparative Example 1-2 is an example in which the amount of flame retardant G1-3 (isopropylated triaryl phosphate, product name REOFOS 65) was 5 parts by mass. Comparative Example 1-1 and Comparative Example 1-2 both failed in the FMVSS302 flammability test and had poor flame retardancy.

Comparative Example 1-3 is an example in which the amount of flame retardant G1-3 (isopropylated triaryl phosphate, product name REOFOS 65) was 15 parts by mass, and Comparative Example 1-3 failed in the water cut-off property test under water pressure of 100 mmAq.

Comparative Example 1-4 is an example in which the amount of flame retardant G1-2 (isopropylated triaryl phosphate, product name REOFOS 50) was 5 parts by mass and in which 2 parts by mass of flame retardant G1-6 (aliphatic condensed phosphate ester, product name DAIGUARD-880) was used in combination, and Comparative Example 1-4 failed in both of the water cut-off property tests under water pressure of 50 mmAq and under water pressure of 100 mmAq.

Comparative Example 1-5 is an example in which 5 parts by mass of flame retardant G1-6 (aliphatic condensed phosphate ester, product name DAIGUARD-880) only was used as the flame retardant, and Comparative Example 1-5 failed in both of the water cut-off property tests under water pressure of 50 mmAq and under water pressure of 100 mmAq.

Comparative Example 1-6 is an example in which 10 parts by mass of flame retardant G1-7 (condensed phosphate ester, product name fyrol PNX-S) only was used as the flame retardant. In Comparative Example 1-6, the foaming reaction was inhibited, and a foam was not obtained.

Comparative Example 1-7 is an example containing no water repellent and failed in all the water cut-off property tests under water pressure of 25 mmAq, under water pressure of 50 mmAq and under water pressure of 100 mmAq.

Comparative Example 1-8 is an example in which the polyol component did not contain any prepolymer and in which the polyol component consisted 100% of a polyether polyol, and Comparative Example 1-8 failed in all the water cut-off property tests under water pressure of 25 mmAq, under water pressure of 50 mmAq and under water pressure of 100 mmAq.

Comparative Example 1-9 is an example in which the prepolymer was contained in an amount of 75 parts by mass per 100 parts by mass of the polyol component, and Comparative Example 1-9 failed in both of the water cut-off property tests under water pressure of 50 mmAq and under water pressure of 100 mmAq.

Comparative Example 1-10 is an example in which the isocyanate index was 95, and Comparative Example 1-10 failed in all the water cut-off property tests under water pressure of 25 mmAq, under water pressure of 50 mmAq and under water pressure of 100 mmAq.

Comparative Example 1-11 is an example in which a petroleum liquid resin was used as the water repellent, and Comparative Example 1-11 failed in both of the water cut-off property tests under water pressure of 50 mmAq and under water pressure of 100 mmAq.

As explained above, the water-sealing materials of the Examples are non-halogen water-sealing materials having excellent water cut-off performance and excellent flame retardancy (low flammability) and are suitable as water-sealing materials used at a part in an automobile, an OA device or the like where low flammability is required.

Examples 2-1 to 2-17 and Comparative Examples 2-1 to 2-19

Flame-retardant sealing materials containing the polyurethane foams of the Examples and the Comparative Examples were prepared using polyurethane raw materials with the compositions shown in Table 2-1 and Table 2-2. The components in Table 2-1 and Table 2-2 are as follows. In Table 2-1 and Table 2-2, the foaming property is A when a good foam was obtained, and the foaming property is B when the foam was poor or could not be obtained.

As polyols A1 and A2, water repellents C1 to C6, foaming agent D, foam stabilizer E, catalyst F2 and the isocyanate, those that were used in Examples 1-1 to 1-20 and Comparative Examples 1-1 to 1-11 described above were used.

Catalyst F2-1: reactive tertiary amine, product name Kaolizer No. 81, manufactured by Kao Corporation Flame retardant G2-1: tris(1,3-dichloro-2-propyl) phosphate, Mw=431, product name WR-30-LV, manufactured by Albemarle Japan Corporation Flame retardant G2-2: isopropylated triaryl phosphate, Mw=500, product name REOFOS 50, viscosity of 50 $mm^2/s$, 25° C., manufactured by Ajinomoto Fine-Techno Co., Inc.

Flame retardant G2-3: isopropylated triaryl phosphate, Mw=650, product name REOFOS 65, viscosity of 61 $mm^2/s$, 25° C., manufactured by Ajinomoto Fine-Techno Co., Inc.

Flame retardant G2-4: halogen-containing condensed phosphate ester, product name CR504L, manufactured by Daihachi Kogyo Co., Ltd.

Flame retardant G2-5: halogen-containing condensed phosphate ester, product name CR570, manufactured by Daihachi Kogyo Co., Ltd.

Flame retardant G2-6: aliphatic condensed phosphate ester, product name DAIGUARD-880, manufactured by Daihachi Kogyo Co., Ltd.

Flame retardant G2-7: condensed phosphate ester, product name fyrol PNX-S, manufactured by ICL-IP Flame retardant G2-8: tris(chloroethyl) phosphate, Mw=285, product name CLP, manufactured by Daihachi Kogyo Co., Ltd.

Flame retardant G2-9: tris(chloropropyl) phosphate, Mw=328, product name TMCPP, manufactured by Daihachi Kogyo Co., Ltd.

Flame retardant G2-10: tricresyl phosphate, Mw=368, product name TCP, manufactured by Daihachi Kogyo Co., Ltd.

In Table 2-1 and Table 2-2 below, catalyst F2-1, flame retardants G2-1 to G2-10, Examples 2-1 to 2-17 and Comparative Examples 2-1 to 2-19 are simply referred to as F1, G1 to G10, Examples 1 to 17 and Comparative Examples 1 to 19, respectively.

TABLE 2-1

(The values of the components are parts by mass.)

| | | Example | | | | | | | | | |
|---|---|---|---|---|---|---|---|---|---|---|---|
| | | 1 | 2 | 3 | 4 | 5 | 6 | 7 | 8 | 9 | 10 |
| Polyol component | A1 | 100 | 100 | 100 | 100 | 100 | 100 | 100 | 100 | 100 | 100 |
| | A2 | | | | | | | | | | |
| Water repellent | C1 | 12 | 12 | 12 | 12 | 12 | | | | | 3 |
| | C2 | | | | | | 12 | | | | |
| | C3 | | | | | | | 12 | | | |
| | C4 | | | | | | | | 12 | | |
| | C5 | | | | | | | | | 12 | |
| | C6 | | | | | | | | | | |
| Foaming agent | D | 3.6 | 3.6 | 3.6 | 3.6 | 3.6 | 3.6 | 3.6 | 3.6 | 3.6 | 3.6 |
| Foam stabilizer | E | 1 | 1 | 1 | 1 | 1 | 1 | 1 | 1 | 1 | 1 |
| Catalyst | F1 | 0.3 | 0.3 | 0.3 | 0.3 | 0.3 | 0.3 | 0.3 | 0.3 | 0.3 | 0.3 |
| | F2 | 0.3 | 0.3 | 0.3 | 0.3 | 0.3 | 0.3 | 0.3 | 0.3 | 0.3 | 0.3 |

TABLE 2-1-continued (The values of the components are parts by mass.)

| | | | | | | | | | | |
|---|---|---|---|---|---|---|---|---|---|---|
| Flame retardant | G1 | 3 | 5 | 10 | 15 | 20 | 10 | 10 | 10 | 10 | 10 |
| | G2 | | | | | | | | | | |
| | G3 | | | | | | | | | | |
| | G4 | | | | | | | | | | |
| | G5 | | | | | | | | | | |
| | G6 | | | | | | | | | | |
| | G7 | | | | | | | | | | |
| | G8 | | | | | | | | | | |
| | G9 | | | | | | | | | | |
| | G10 | | | | | | | | | | |
| Isocyanate | | 50.1 | 50.1 | 50.1 | 50.1 | 50.1 | 49.7 | 51.0 | 49.9 | 49.9 | 49.2 |
| Isocyanate index | | 120 | 120 | 120 | 120 | 120 | 120 | 120 | 120 | 120 | 120 |
| Foaming property | | A | A | A | A | A | A | A | A | A | A |
| Density | kg/m³ | 28 | 28 | 29 | 29 | 30 | 28 | 29 | 29 | 29 | 24 |
| 25 mmAq water cut-off property | | A | A | A | A | A | A | A | A | A | A |
| 50 mmAq water cut-off property | | A | A | A | A | A | A | A | A | A | A |
| 100 mmAq water cut-off property | | AA | AA | AA | AA | AA | AA | AA | AA | AA | A |
| 100 mmAq water leakage time | | 24< | 24< | 24< | 24< | 24< | 24< | 24< | 24< | 24< | 18 |
| FMVSS302 flame retardancy | | A | A | A | A | A | A | A | A | A | A |
| Fogging property | | AA | AA | AA | A | A | AA | AA | AA | AA | AA |

| | | Example | | | | | | |
|---|---|---|---|---|---|---|---|---|
| | | 11 | 12 | 13 | 14 | 15 | 16 | 17 |
| Polyol component | A1 | 100 | 100 | 100 | 100 | 100 | 100 | 80 |
| | A2 | | | | | | | 20 |
| Water repellent | C1 | 35 | 12 | 12 | 12 | 12 | 12 | 12 |
| | C2 | | | | | | | |
| | C3 | | | | | | | |
| | C4 | | | | | | | |
| | C5 | | | | | | | |
| | C6 | | | | | | | |
| Foaming agent | D | 3.6 | 3.6 | 3.6 | 3.6 | 4.0 | 3.2 | 3.6 |
| Foam stabilizer | E | 1 | 1 | 1 | 1 | 1 | 1 | 1 |
| Catalyst | F1 | 0.3 | 0.3 | 0.3 | 0.3 | 0.3 | 0.3 | 0.3 |
| | F2 | 0.3 | 0.3 | 0.3 | 0.3 | 0.3 | 0.3 | 0.3 |
| Flame retardant | G1 | 10 | 10 | 10 | 10 | 10 | 10 | 10 |
| | G2 | | | | | | | |
| | G3 | | | | | | | |
| | G4 | | | | | | | |
| | G5 | | | | | | | |
| | G6 | | | | | | | |
| | G7 | | | | | | | |
| | G8 | | | | | | | |
| | G9 | | | | | | | |
| | G10 | | | | | | | |
| Isocyanate | | 52.4 | 41.8 | 45.9 | 62.6 | 54.7 | 45.6 | 51.0 |
| Isocyanate index | | 120 | 100 | 110 | 150 | 120 | 120 | 120 |
| Foaming property | | A | A | A | A | A | A | A |
| Density | kg/m³ | 40 | 30 | 30 | 35 | 22 | 39 | 31 |
| 25 mmAq water cut-off property | | A | A | A | A | A | A | A |
| 50 mmAq water cut-off property | | A | A | A | A | A | A | A |
| 100 mmAq water cut-off property | | AA | A | AA | AA | AA | AA | A |
| 100 mmAq water leakage time | | 24< | 9 | 24< | 24< | 24< | 24< | 13 |
| FMVSS302 flame retardancy | | A | A | A | A | A | A | A |
| Fogging property | | AA | AA | AA | AA | AA | AA | AA |

TABLE 2-2

(The values of the components are parts by mass.)

| | | Comparative Example | | | | | | | | | |
|---|---|---|---|---|---|---|---|---|---|---|---|
| | | 1 | 2 | 3 | 4 | 5 | 6 | 7 | 8 | 9 | 10 |
| Polyol component | A1 | 100 | 100 | 100 | 100 | 100 | 100 | 100 | 100 | 100 | 100 |
| | A2 | | | | | | | | | | |
| Water repellent | C1 | 12 | 12 | 12 | 12 | 12 | 12 | 12 | 12 | 12 | 12 |
| | C2 | | | | | | | | | | |
| | C3 | | | | | | | | | | |
| | C4 | | | | | | | | | | |
| | C5 | | | | | | | | | | |
| | C6 | | | | | | | | | | |
| Foaming agent | D | 3.6 | 3.6 | 3.6 | 3.6 | 3.6 | 3.6 | 3.6 | 3.6 | 3.6 | 3.6 |
| Foam stabilizer | E | 1 | 1 | 1 | 1 | 1 | 1 | 1 | 1 | 1 | 1 |
| Catalyst | F1 | 0.3 | 0.3 | 0.3 | 0.3 | 0.3 | 0.3 | 0.3 | 0.3 | 0.3 | 0.3 |
| | F2 | 0.3 | 0.3 | 0.3 | 0.3 | 0.3 | 0.3 | 0.3 | 0.3 | 0.3 | 0.3 |
| Flame retardant | G1 | 0 | 2 | 30 | | | | | | | |
| | G2 | | | | | | | | | 5 | |
| | G3 | | | | 5 | 15 | | | | | |
| | G4 | | | | | | 5 | 15 | | | |
| | G5 | | | | | | | | 15 | | |
| | G6 | | | | | | | | | 2 | 5 |
| | G7 | | | | | | | | | | |
| | G8 | | | | | | | | | | |
| | G9 | | | | | | | | | | |
| | G10 | | | | | | | | | | |
| Isocyanate | | 50.1 | 50.1 | 50.1 | 50.1 | 50.1 | 50.1 | 50.1 | 50.1 | 50.1 | 50.1 |
| Isocyanate index | | 120 | 120 | 120 | 120 | 120 | 120 | 120 | 120 | 120 | 120 |
| Foaming property | | A | A | A | A | A | A | A | A | A | A |
| Density | kg/m$^3$ | 28 | 28 | 32 | 29 | 30 | 28 | 29 | 30 | 28 | 29 |
| 25 mmAq water cut-off property | | A | A | A | A | A | A | A | A | A | A |
| 50 mmAq water cut-off property | | A | A | A | A | A | A | A | B | B | B |
| 100 mmAq water cut-off property | | AA | AA | B | AA | B | B | B | B | B | B |
| 100 mmAq water leakage time | | 24< | 24< | 8 | 24< | 6 | 1 | <1 | <1 | 1 | 1 |
| FMVSS302 flame retardancy | | B | B | A | B | A | A | A | A | A | A |
| Fogging property | | AA | AA | B | AA | A | AA | A | B | AA | AA |

| | | Comparative Example | | | | | | | | |
|---|---|---|---|---|---|---|---|---|---|---|
| | | 11 | 12 | 13 | 14 | 15 | 16 | 17 | 18 | 19 |
| Polyol component | A1 | 100 | 100 | 100 | 100 | 100 | | 75 | 100 | 100 |
| | A2 | | | | | | 100 | 25 | | |
| Water repellent | C1 | 12 | 12 | 12 | 12 | | 12 | 12 | 12 | |
| | C2 | | | | | | | | | |
| | C3 | | | | | | | | | |
| | C4 | | | | | | | | | |
| | C5 | | | | | | | | | |
| | C6 | | | | | | | | | 25 |
| Foaming agent | D | 3.6 | 3.6 | 3.6 | 3.6 | 3.6 | 3.6 | 3.6 | 3.6 | 3.6 |
| Foam stabilizer | E | 1 | 1 | 1 | 1 | 1 | 1 | 1 | 1 | 1 |
| Catalyst | F1 | 0.3 | 0.3 | 0.3 | 0.3 | 0.3 | 0.3 | 0.3 | 0.3 | 0.3 |
| | F2 | 0.3 | 0.3 | 0.3 | 0.3 | 0.3 | 0.3 | 0.3 | 0.3 | 0.3 |
| Flame retardant | G1 | | | | | | 10 | 10 | 10 | 10 |
| | G2 | | | | | | | | | |
| | G3 | | | | | | | | | |
| | G4 | | | | | | | | | |
| | G5 | | | | | | | | | |
| | G6 | | | | | | | | | |
| | G7 | 10 | | | | | | | | |
| | G8 | | 5 | | | | | | | |
| | G9 | | | 5 | | | | | | |
| | G10 | | | | 5 | | | | | |
| Isocyanate | | | 50.1 | 50.1 | 50.1 | 48.9 | 54.4 | 51.2 | 39.7 | 48.9 |
| Isocyanate index | | | 120 | 120 | 120 | 120 | 120 | 120 | 95 | 120 |
| Foaming property | | Largely inhibited reaction | A | A | A | A | A | A | A | A |
| Density | kg/m$^3$ | — | 28 | 29 | 28 | 28 | 30 | 31 | 29 | 35 |
| 25 mmAq water cut-off property | | — | A | A | A | B | B | A | B | A |
| 50 mmAq water cut-off property | | — | A | A | A | B | B | B | B | B |

TABLE 2-2-continued (The values of the components are parts by mass.)

| | | | | | | | | |
|---|---|---|---|---|---|---|---|---|
| 100 mmAq water cut-off property | — | AA | AA | AA | B | B | B | B | B |
| 100 mmAq water leakage time | | 24< | 24< | 24< | 1 | <1 | 5 | <1 | 4 |
| FMVSS302 flame retardancy | — | A | A | B | A | A | A | A | A |
| Fogging property | — | B | B | B | AA | AA | AA | AA | B |

The density (kg/m³, JIS K 7222), the water cut-off property, the flame retardancy and the fogging property of each flame-retardant sealing material of the Examples and the Comparative Examples were measured. The water cut-off property and the flame retardancy were measured and evaluated in the similar manners as in Examples 1-1 to 1-20 and Comparative Examples 1-1 to 1-11 described above.

The fogging property was measured in accordance with DIN75201 and determined to be the best (AA) when the glass haze degree was 90 or more after three hours, to pass (A) when the glass haze degree was more than 80 and less than 90 and to fail (B) when the glass haze degree was 80 or less.

The results of the measurement are shown at the bottom of Table 2-1 and Table 2-2.

As shown by the measurement results in Table 2-1, the flame-retardant sealing materials of the Examples all passed the water cut-off property test under water pressure of 100 mmAq, passed the FMVSS302 flammability test with respect to the flame retardancy and passed the fogging property test (including the best). In particular, Examples 2-1 to 2-3 and 2-6 to 2-17, in which the flame retardant was contained in an amount of 3 to 12 parts by mass per 100 parts by mass of the polyol component, had fogging property of the best evaluation in addition to high water cut-off property and excellent flame retardancy. Moreover, Examples 2-1 to 2-9, 2-11 and 2-13 to 2-16, which each had an isocyanate index of 110 to 150 and contained a hydroxyl-terminated prepolymer obtained by the reaction of a polyether polyol and an isocyanate only as the polyol component and in which the amount of the water repellent added was 5 to 35 parts by mass per 100 parts by mass of the polyol component, had water cut-off property of the best evaluation under water pressure of 100 mmAq.

On the other hand, Comparative Example 2-1 shown in Table 2-2 is an example using no flame retardant, and Comparative Example 2-2 is an example in which the amount of flame retardant G2-1 (tris(1,3-dichloro-2-propyl) phosphate, product name WR-30-LV) was 2 parts by mass. Comparative Example 2-1 and Comparative Example 2-2 both failed in the FMVSS302 flammability test and had poor flame retardancy.

Comparative Example 2-3 is an example in which the amount of flame retardant G2-1 (tris(1,3-dichloro-2-propyl) phosphate, product name WR-30-LV) was 30 parts by mass. Comparative Example 2-3 failed in the water cut-off property test under water pressure of 100 mmAq and failed in the fogging property test.

Comparative Example 2-4 is an example in which 5 parts by mass of non-halogen non-condensed flame retardant G2-3 (isopropylated triaryl phosphate, product name REO-FOS 65) was used as the flame retardant. Comparative Example 2-4 failed in the FMVSS302 flammability test and had poor flame retardancy.

Comparative Example 2-5 is an example in which 15 parts by mass of non-halogen non-condensed flame retardant G2-3 (isopropylated triaryl phosphate, product name REO-FOS 65) was used as the flame retardant, and Comparative Example 2-5 failed in the water cut-off property test under water pressure of 100 mmAq.

Comparative Example 2-6 is an example in which 5 parts by mass of flame retardant G2-4 (halogen-containing condensed phosphate ester, product name CR504L) was used as the flame retardant, and Comparative Example 2-6 failed in the water cut-off property test under water pressure of 100 mmAq.

Comparative Example 2-7 is an example in which 15 parts by mass of flame retardant G2-4 (halogen-containing condensed phosphate ester, product name CR504L) was used as the flame retardant, and Comparative Example 2-7 failed in both of the water cut-off property tests under water pressure of 50 mmAq and under water pressure of 100 mmAq.

Comparative Example 2-8 is an example in which 15 parts by mass of flame retardant G2-5 (halogen-containing condensed phosphate ester, product name CR507L) was used as the flame retardant. Comparative Example 2-8 failed in both of the water cut-off property tests under water pressure of 50 mmAq and under water pressure of 100 mmAq and failed (B) in the fogging property test.

Comparative Example 2-9 is an example in which 5 parts by mass of non-halogen non-condensed flame retardant G2-2 (isopropylated triaryl phosphate, product name REO-FOS 50) and 2 parts by mass of flame retardant G2-6 (aliphatic condensed phosphate ester, product name DAIGUARD-880) were used in combination as the flame retardants, and Comparative Example 2-9 failed in both of the water cut-off property tests under water pressure of 50 mmAq and under water pressure of 100 mmAq.

Comparative Example 2-10 is an example in which 5 parts by mass of flame retardant G2-6 (aliphatic condensed phosphate ester, product name DAIGUARD-880) was used as the flame retardant, and Comparative Example 2-10 failed in both of the water cut-off property tests under water pressure of 50 mmAq and under water pressure of 100 mmAq.

Comparative Example 2-11 is an example in which 10 parts by mass of flame retardant G2-7 (condensed phosphate ester, product name fyrol PNX-S) was used as the flame retardant. In Comparative Example 2-11, the foaming reaction was inhibited, and a foam was not obtained.

Comparative Example 2-12 is an example in which 5 parts by mass of flame retardant G2-8 (tris(chloroethyl) phosphate, product name CLP) was used as the flame retardant, and Comparative Example 2-12 failed (B) in the fogging property test.

Comparative Example 2-13 is an example in which 5 parts by mass of flame retardant G2-9 (tris(chloropropyl)

phosphate, product name TMCPP) was used as the flame retardant, and Comparative Example 2-13 failed (B) in the fogging property test.

Comparative Example 2-14 is an example in which 5 parts by mass of flame retardant G2-10 (tricresyl phosphate, product name TCP) was used as the flame retardant. Comparative Example 2-14 failed in the FMVSS302 flammability test and failed (B) also in the fogging property test.

Comparative Example 2-15 is an example containing no water repellent and failed in all the water cut-off property tests under water pressure of 25 mmAq, under water pressure of 50 mmAq and under water pressure of 100 mmAq.

Comparative Example 2-16 is an example in which the polyol component did not contain any prepolymer and in which the polyol component consisted 100% of a polyether polyol, and Comparative Example 2-16 failed in all the water cut-off property tests under water pressure of 25 mmAq, under water pressure of 50 mmAq and under water pressure of 100 mmAq.

Comparative Example 2-17 is an example in which the prepolymer was contained in an amount of 75 parts by mass per 100 parts by mass of the polyol component, and Comparative Example 2-17 failed in both of the water cut-off property tests under water pressure of 50 mmAq and under water pressure of 100 mmAq.

Comparative Example 2-18 is an example in which the isocyanate index was 95, and Comparative Example 2-18 failed in all the water cut-off property tests under water pressure of 25 mmAq, under water pressure of 50 mmAq and under water pressure of 100 mmAq.

Comparative Example 2-19 is an example in which a petroleum liquid resin was used as the water repellent, and Comparative Example 2-19 failed in both of the water cut-off property tests under water pressure of 50 mmAq and under water pressure of 100 mmAq.

As explained above, the flame-retardant sealing materials of the Examples had excellent water cut-off performance, excellent flame retardancy (low flammability) and good fogging property and are suitable as flame-retardant sealing materials used at a part in an automobile, an OA device or the like where low flammability is required.

REFERENCE SIGNS LIST

50: Flame-retardant sealing material
71: Acrylic resin plate

The invention claimed is:

1. A flame-retardant sealing material comprising a polyurethane foam formed from a polyurethane raw material containing a polyol component, an isocyanate, a foaming agent, a catalyst, a water repellent and a flame retardant,
wherein the polyol component contains 80 to 100 parts by mass of a hydroxyl-terminated prepolymer obtained by the reaction of a polyether polyol and an isocyanate per 100 parts by mass of the polyol component,
the water repellent contains at least one selected from the group consisting of a polybutadiene polyol, a hydrogenated polyol of a polybutadiene, a polyisoprene polyol and a hydrogenated polyol of a polyisoprene,
the hydroxyl-terminated prepolymer has a viscosity at 30° C. of 2000 to 30000 mPa·s,
the polyether polyol has a molecular weight of 300 to 10000,
the amount of the water repellent is 3 to 25 parts by mass per 100 parts by mass of the polyol component,
the flame retardant is a halogen-containing non-condensed phosphate ester that is liquid at room temperature which is tris(1,3-dichloro-2-propyl)phosphate,
the amount of the flame retardant is 3 to 12 parts by mass per 100 parts by mass of the polyol component, and
the isocyanate index is 100 to 150.

* * * * *